United States Patent
Cuddihy et al.

(10) Patent No.: US 9,509,775 B2
(45) Date of Patent: Nov. 29, 2016

(54) COOPERATIVE OCCUPANT SENSING

(71) Applicant: Ford Global Technologies, LLC, Dearborn, MI (US)

(72) Inventors: Mark A. Cuddihy, New Boston, MI (US); Manoharprasad K. Rao, Novi, MI (US); Jialiang Le, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/489,596

(22) Filed: Sep. 18, 2014

(65) Prior Publication Data

US 2016/0088086 A1    Mar. 24, 2016

(51) Int. Cl.
*H04L 29/08* (2006.01)
*H04W 4/00* (2009.01)
*H04W 84/18* (2009.01)

(52) U.S. Cl.
CPC ............... *H04L 67/12* (2013.01); *H04W 4/00* (2013.01); *H04W 4/008* (2013.01); *H04W 84/18* (2013.01)

(58) Field of Classification Search
CPC ...... H04L 67/12; H04W 4/008; H04W 84/18
See application file for complete search history.

(56) References Cited

U.S. PATENT DOCUMENTS

| | | | |
|---|---|---|---|
| 8,106,747 B2 | 1/2012 | Nguyen | |
| 8,635,091 B2 | 1/2014 | Amigo et al. | |
| 9,104,537 B1* | 8/2015 | Penilla | G06F 17/00 |
| 2005/0046584 A1* | 3/2005 | Breed | B60C 11/24 |
| | | | 340/13.31 |
| 2008/0297341 A1 | 12/2008 | McClanahan | |
| 2012/0053793 A1* | 3/2012 | Sala | B60N 2/0244 |
| | | | 701/45 |
| 2012/0172012 A1* | 7/2012 | Sumcad | H04W 4/12 |
| | | | 455/414.1 |
| 2012/0253607 A1 | 10/2012 | Choi | |
| 2013/0200991 A1* | 8/2013 | Ricci | B60K 37/06 |
| | | | 340/4.3 |
| 2013/0226413 A1 | 8/2013 | Cuddihy et al. | |
| 2014/0045147 A1 | 2/2014 | Mohn et al. | |
| 2014/0309813 A1* | 10/2014 | Ricci | B60Q 1/00 |
| | | | 701/2 |

FOREIGN PATENT DOCUMENTS

CN          103072498 A      5/2013

* cited by examiner

*Primary Examiner* — Lewis West
(74) *Attorney, Agent, or Firm* — Frank A. MacKenzie; Bejin Bieneman PLC

(57) ABSTRACT

A vehicle system includes a communication interface and a processing device. The communication interface is programmed to pair with at least one mobile device. The processing device is programmed to receive a data file, which includes occupant information, sent from the mobile device. The processing device is further programmed to update at least one vehicle setting based on the occupant information.

18 Claims, 2 Drawing Sheets

COOPERATIVE OCCUPANT SENSING

BACKGROUND

Consumer products can often be customized for a particular user's needs and preferences, especially when personal information about the user is considered. Consumers, however, are sometimes reluctant to share personal information, leaving consumers with products that perform according to the needs and preferences of the average user. Nevertheless, some consumer product developers have attempted to customize products based on information collected about the way a particular product is used.

DETAILED DESCRIPTION

Figure 1:
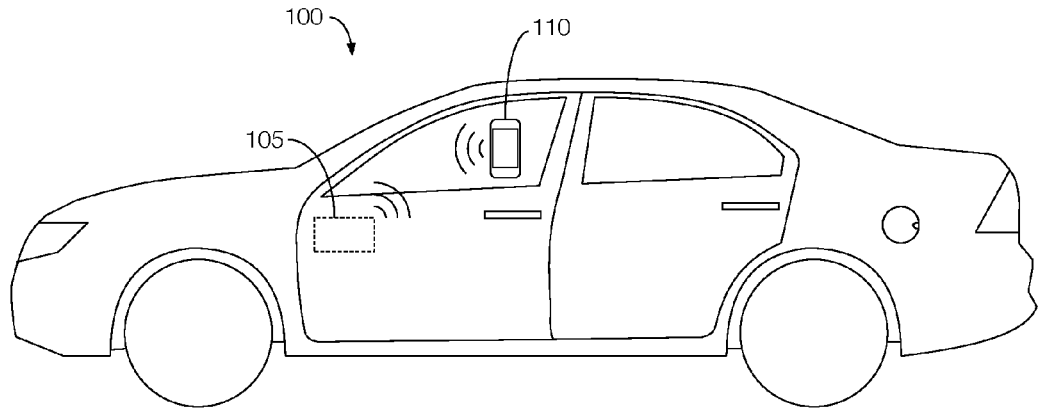
FIG. 1 illustrates an example vehicle incorporating a system for updating vehicle settings based on occupant information received via a paired mobile device.

In the context of automobiles, driver profiles, stored locally in vehicle memory, are sometimes used to update various vehicle settings. The profiles may be developed from a driver's driving habits. Vehicles, however, cannot always distinguish between different drivers. Thus, a single profile may be developed using the driving habits of multiple drivers sharing a particular vehicle. Moreover, because the profile is stored locally, it cannot be transferred to other vehicles, nor does it consider driving habits from other vehicles. It may take a long time for a vehicle to build an accurate profile for a particular driver that frequently uses at least one other vehicle. Vehicles that are frequently driven by different drivers, such as rental cars, may never have the opportunity to build an accurate driver profile.

In addition to driver habits, vehicle settings can be customized from occupant information added to the profile. Because the occupant information is stored locally, it would need to be entered into every vehicle a particular occupant uses. Some occupants may object to providing such information because of privacy issues or because doing so may be viewed as tedious or unnecessary. Failing to provide such information, however, may cause the occupant to miss out on certain significant setting updates or customizations.

One way to develop accurate profiles is to store the occupant information remotely relative to the vehicle. For instance, the occupant information could be stored on a mobile device carried by the occupant and configured to pair with a vehicle system. The vehicle system includes a communication interface programmed to pair with one or more mobile devices and a processing device programmed to receive a data file sent from the mobile device. The data file includes the occupant information. The processing device updates vehicle setting based on the occupant information. Moreover, if the data file came from the driver's mobile device, the data file can be updated and transmitted to the mobile device so that the driver's most recent driving habits are accessible to other vehicles the driver may operate.

Furthermore, to mitigate privacy concerns, the occupant information may be based on information provided by the occupant to the mobile device. Further, the occupant information may be deleted from memory of the vehicle after the vehicle is turned off. In other words, after the occupant leaves the vehicle, no information about the occupant is stored in the vehicle.

An example vehicle system, that can update vehicle settings based on the data profiles transmitted from an occupant's mobile device, includes a communication interface and a processing device. The communication interface is programmed to pair with at least one mobile device. The processing device is programmed to receive a data file, which includes occupant information, sent from the mobile device. The processing device is further programmed to update at least one vehicle setting based on the occupant information. The elements shown may take many different forms and include multiple and/or alternate components and facilities. The example components illustrated are not intended to be limiting. Indeed, additional or alternative components and/or implementations may be used.

As illustrated in FIG. 1, the vehicle 100 includes a vehicle system 105 that updates vehicle settings based on occupant information received via a paired mobile device 110. Although illustrated as a sedan, the vehicle 100 may include any passenger or commercial automobile such as a car, a truck, a sport utility vehicle, a crossover vehicle, a van, a minivan, a taxi, a bus, etc. In some possible approaches, the vehicle 100 is an autonomous vehicle configured to operate in an autonomous (e.g., driverless) mode, a partially autonomous mode, and/or a non-autonomous mode.

The vehicle system 105 may be configured to pair with any passenger's mobile device 110 and receive the occupant information from each paired mobile device 110. As discussed in greater detail below, the vehicle system 105 may prompt one or more passengers to match each paired mobile device 110 with each passenger by seating arrangement. The occupant information for the person identified as the "driver" may be used to update one or more vehicle settings related to the operation of the vehicle 100. Thus, the settings may be customized for the driver. The occupant information for other passengers may be used to adjust certain vehicle subsystems relative to each passenger's location in the vehicle 100. For instance, the occupant information may indicate that a particular passenger is pregnant. The operation of the vehicle's safety system (e.g., how certain airbags may be deployed) may be adjusted to account for a pregnant passenger sitting in a particular seat.

The vehicle system 105 may be updated with additional information collected during operation of the vehicle 100. The additional information may be collected by the vehicle 100 based on, e.g., the driver's driving habits. Alternatively, additional information may be collected by the mobile device 110. That is, the mobile device 110 may receive occupant information voluntarily provided by one or more occupants.

In some instances, instead of or in addition to adjusting vehicle settings, the vehicle system 105 may present instructions to one or more passengers based on the occupant information received. For instance, continuing the example where a passenger is pregnant, the instructions may direct the pregnant passenger to, e.g., wear a seatbelt in a particular way. As discussed in greater detail below, the instructions may be presented via a user interface device located in the passenger compartment of the vehicle 100. Alternatively or in addition, the instructions may be presented via the passenger's mobile device 110.

Figure 2:
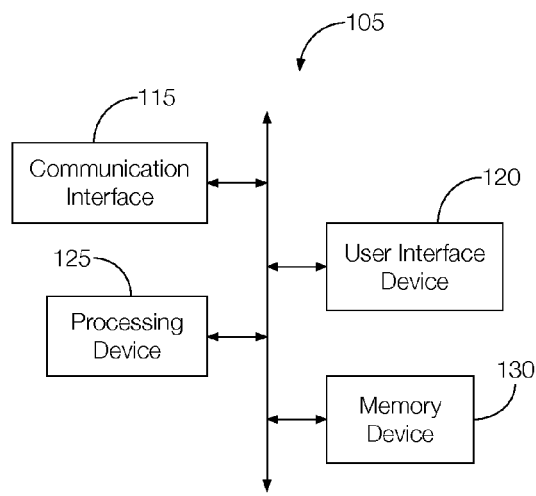
FIG. 2 is a block diagram of example components that may be incorporated into the vehicle system shown in FIG. 1.

FIG. 2 is a block diagram of example components that may be incorporated into the vehicle system 105. The vehicle system 105, as shown, includes a communication interface 115, a user interface device 120, a memory device 130, and a processing device 125.

The communication interface 115 may be programmed to wirelessly communicate with mobile devices 110 located in or near the vehicle 100, including the mobile devices 110 carried by any occupants. The communication interface 115 may communicate with the mobile devices 110 in accordance with any number of telecommunications protocols such as, e.g., the Bluetooth® protocol. The communication interface 115 may receive a data file from each paired mobile device 110. In addition to the occupant information, partially described above, the data file may include a mobile device identifier such as the name of the mobile device 110 or an identification number.

The user interface device 120 may be configured to present audio or video information, or both, to one or more passengers in the passenger compartment of the vehicle 100. As discussed in greater detail below, the information presented may be based at least in part on the occupant information received from each paired mobile device 110. Moreover, the user interface device 120 may be configured to receive user inputs. In some possible approaches, the user interface device 120 may include a touch-sensitive display screen. Thus, the user interface device 120 may present a virtual seat arrangement and a list of device identifiers. Each device identifier may be associated with one of the paired mobile devices 110. The user interface device 120 may prompt one of the occupants to associate each device identifier with one of the virtual seats. Additionally, the user interface device 120 may be programmed to receive a user selection associating each device identifier with one of the virtual seats. Therefore, in response to the prompt, the driver or front-seat occupant may drag an icon representing each paired mobile device 110 to the appropriate virtual seat. For instance, the driver may drag the icon representing the driver's mobile device 110 to the virtual driver seat. The icon representing the other front-seat occupant's mobile device 110 may be dragged to the virtual front passenger seat. The icon representing the driver side rear occupant's mobile device 110 may be dragged to the driver's side rear virtual seat, and the icon representing the passenger side rear occupant's mobile device may be dragged to the passenger side rear virtual seat. At least one icon may be placed in a virtual seat and the seating arrangement confirmed by at least one occupant, otherwise no action may be taken to adjust vehicle settings based on the data from the user interface device 120. Also, the vehicle settings may be adjusted for confirmed virtual seating positions only.

The processing device 125 may be programmed to receive the data file sent from each paired mobile device 110 and update at least one vehicle setting based on the occupant information received. In some instances, upon detecting a paired mobile device 110, the processing device 125 may request, via the communication interface 115, that each mobile device 110 transmit its data file. Alternatively, the data files may be transmitted automatically upon pairing with the communication interface 115.

The data file may include the mobile device identifier as well as occupant information. Occupant information may include, e.g., health information such as a particular occupant's age, gender, height, weight, any special medical condition, and whether the occupant is pregnant. Moreover, the occupant information may represent data related to a particular occupant's driving habits.

The processing device 125 may be programmed to process the occupant information and adjust one or more vehicle settings according to, e.g., where each passenger is sitting. From the seating arrangement provided to the user interface device 120, the processing device 125 may be programmed to associate each mobile device identifier and each data file to a particular seat in the vehicle 100. The adjustments to various vehicle subsystems may be based on the seating arrangement. For example, the occupant information associated with the driver may be used to adjust vehicle subsystems that would cause the vehicle 100 to respond in a way preferable to the driver. For any pregnant passenger, the processing device 125 may command the user interface device 120 to present instructions for wearing a seatbelt in a particular manner. The instructions may include audio instructions, video instructions, or a combination of both. In addition or in the alternative, the processing device 125 may command the vehicle safety system to change the way airbags are deployed for pregnant occupants or for occupants outside a particular range of heights and/or weights or for occupants with special medical conditions.

The processing device 125 may be further programmed to update the data file associated with the driver and transmit the updated data file to the driver's mobile device 110. As the driver operates the vehicle 100, data associated with the driver's driving habits may be collected by one or more vehicle subsystems. The driving habits may be received and processed by the processing device 125 to generate the updated data file. The processing device 125 may be programmed to command the communication interface 115 to transmit the updated data file to the driver's mobile device 110.

In some possible implementations, when the data files are no longer needed, the processing device 125 may delete data files from a local memory device 130. For instance, when the vehicle 100 is turned off or when a passenger associated with a data file exits the vehicle 100, the processing device 125 may cause one or more data files stored to be removed from the local memory device 130. This way, personal information about each occupant is not stored long-term in the vehicle 100, which reduces the likelihood that an occupant's personal information can be improperly accessed. The processing device 125 may determine whether a passenger has exited the vehicle 100 based on a signal received from a seat sensor or when the mobile device 110 associated with a particular passenger is no longer within communication range of or paired with the vehicle system 105.

Figure 3:
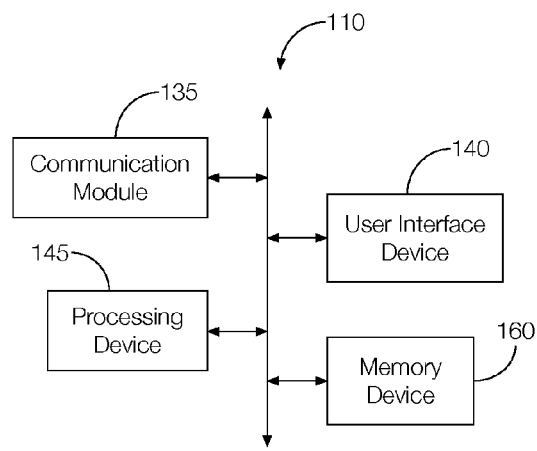
FIG. 3 is a block diagram of example components that may be incorporated into a mobile device used by an occupant of the vehicle of FIG. 1.

Referring now to FIG. 3, each mobile device 110 capable of pairing with the vehicle system 105 may include a communication module 135, a user interface device 140, a memory device 160 and a processing device 145.

The communication module 135 may be configured to wirelessly communicate with the communication interface 115 of the vehicle system 105. For instance, the communication module 135 may be configured to communicate using a telecommunication protocol such as Bluetooth®. In response to a command from the processing device 145 on-board the mobile device 110, the communication module 135 may transmit the data file from the mobile device 110 to the vehicle system 105. In addition, the communication module 135 may be configured to receive an updated data file from the communication interface 115 of the vehicle system 105.

The user interface device 140 may be programmed to prompt the user to input occupant information. For instance, the user interface device 140 may present a number of questions for the user to answer. The answers provided may be compiled into the data file. The user interface device 140 may include, e.g., a touch-sensitive display for receiving the user input.

The processing device 145 may be programmed to process the user input provided to the user interface device 140 to generate the data file. Moreover, the processing device 145 may be programmed to detect when the mobile device 110 has paired with a vehicle system 105, and command the communication module 135 to transmit the data file to the vehicle system 105 either automatically or in response to a request for the data file from the vehicle system 105. If an updated data file is received, the processing device 145 may be programmed to store the updated data file in an on-board memory device 160.

Figure 4:
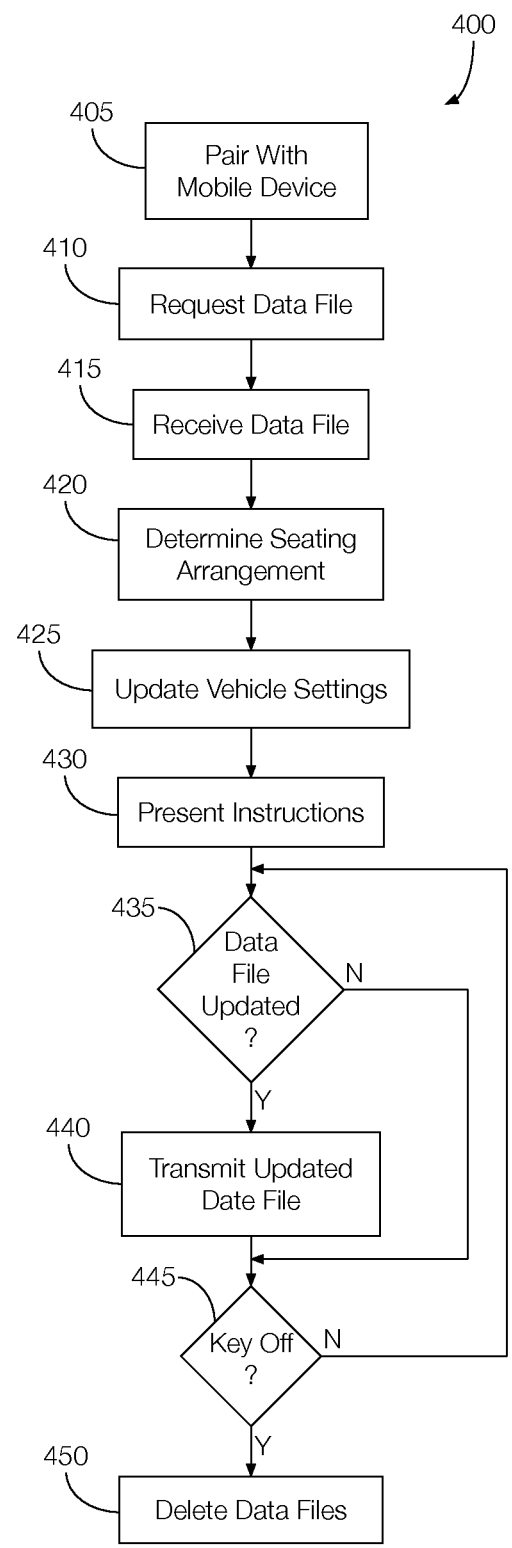
FIG. 4 is a flowchart of an example process that may be executed by the vehicle system shown in FIGS. 1 and 2.

FIG. 4 is a flowchart of an example process 400 that may be executed by the vehicle system 105.

At block 405, the vehicle system 105 may pair with one or more mobile devices 110 carried by the vehicle occupants. The pairing may be facilitated by the communication interface 115 of the vehicle system 105 and the communication module 135 of the mobile device 110 in accordance with a wireless communication protocol such as Bluetooth®.

At block 410, the processing device 125 of the vehicle system 105 may request the data file from each paired mobile device 110. The request may be transmitted from the communication interface 115 of the vehicle system 105 to the communication module 135 of the mobile device 110.

At block 415, the vehicle system 105 may receive the data file from each paired mobile device 110. The data file may include occupant information, including health information and driving habits, associated with each occupant. The data file may be received via the communication interface 115 and stored in a local memory device 130. While stored, the data files may be accessible to the processing device 125 of the vehicle system 105.

At block 420, the processing device 125 of the vehicle system 105 may determine the seating arrangement from, e.g., a user selection. For instance, the processing device 125 may command the user interface device 120 to present virtual seats in a manner that represents the passenger compartment along with the mobile device identifier of each paired mobile device 110. The processing device 125 may further prompt an occupant, via the user interface device 120, to associate each mobile device identifier with one of the virtual seats. The processing device 125 may determine the seating arrangement based on the user selection provided to the user interface device 120. The user selection, as discussed above, may include dragging an icon representing one of the paired mobile devices 110 to one of the virtual seats.

At block 425, the processing device 125 may update one or more vehicle settings based on the occupant information and in accordance with the seating arrangement. For instance, the driving habits and health information of the occupant sitting in the driver's seat may be used to customize vehicle subsystems associated with the control or operation of the vehicle 100. The occupant information, excluding the health information and driving habits, of the other occupants may be used to adjust other settings. The settings for the driver and non-drivers may include the settings associated with the vehicle safety system (e.g., airbags, seatbelts, or the like) or seat position (e.g., incline, leg room, etc.).

At block 430, the processing device 125 may command the user interface device 120 to present instructions, based on the occupant information received, to one or more occupants. For instance, if the occupant information indicates that a passenger is pregnant, the instructions may direct the pregnant passenger to, e.g., wear a seatbelt in a particular way. The instructions may be presented audibly, visually, or both via the user interface device 120.

At decision block 435, the processing device 125 may determine whether the data file has been updated. The data file may be updated for the driver based on driving habits learned during operation of the vehicle 100. Therefore, in some possible implementations, decision block 435 may be executed only when a data file has been associated with a passenger in the driver's seat. If the data file has been updated, the process 400 may continue at block 440. If the data file has not been updated, the process 400 may continue at block 445.

At block 440, the processing device 125 may command the communication interface 115 to transmit the updated data file to the driver's mobile device 110. The communication interface 115 may access the updated data file from a local memory device 130, package the updated data file in a way that complies with a wireless communication protocol, and wirelessly transmit the updated data file to the mobile device 110.

At block 445, the processing device 125 may determine whether the vehicle 100 has been turned off or whether at least one passenger has exited the vehicle 100. The processing device 125 may determine whether a passenger has exited the vehicle 100 based on a signal received from a seat sensor or when the mobile device 110 associated with a particular passenger is no longer within communication range of or paired with the vehicle system 105. If the vehicle 100 has been turned off or if a passenger has exited the vehicle 100, the process 400 may continue at block 450. Otherwise, the process 400 may return to block 435.

At block 450, the processing device 125 may delete one or more data files from the local memory device 130. If the vehicle 100 is turned off, all data files may be deleted. If fewer than all passengers have exited the vehicle 100, but the vehicle 100 remains on, the processing device 125 may delete the data files associated with those passengers who left the vehicle 100.

The process 400 may end after block 450.

In general, the computing systems and/or devices described may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
   a communication interface programmed to pair with at least one mobile device when the at least one mobile device is in a vehicle; and
   a processing device programmed to receive a data file sent from the mobile device, the data file including occupant information, wherein the processing device is programmed to update at least one vehicle setting based on the occupant information, update the data file during operation of the vehicle, and command the communication interface to transmit the updated data file to the mobile device,
   wherein the processing device is programmed to delete the updated data file from a local memory after the updated data file is transmitted to the at least one mobile device and after an occupant associated with the mobile device has exited the vehicle.

2. The vehicle system of claim 1, further comprising a user interface device configured to present instructions to the occupant, wherein the instructions are based at least in part on the occupant information.

3. The vehicle system of claim 1, further comprising a user interface device programmed to present a plurality of virtual seats and a device identifier associated with the mobile device.

4. The vehicle system of claim 3, wherein the user interface device is programmed to prompt the occupant to associate the device identifier with one of the virtual seats.

5. The vehicle system of claim 4, wherein the processing device is programmed to update the at least one vehicle setting based at least in part on the virtual seat associated with the device identifier.

6. The vehicle system of claim 4, wherein the user interface device is programmed to receive a selection associating the device identifier with one of the virtual seats and transmit the selection to the processing device, wherein the processing device is programmed to update the at least one vehicle setting based at least in part on the virtual seat associated with the device identifier.

7. The vehicle system of claim 1, wherein the communication interface is programmed to wirelessly communicate with the mobile device.

8. The vehicle system of claim 1, wherein the processing device is programmed to update the data file based at least in part on how the occupant associated with the at least one mobile device operates the vehicle.

9. The vehicle system of claim 1, wherein the processing device is programmed to request the data file from each paired mobile device.

10. A method comprising:
pairing at least one mobile device with a vehicle system;
receiving a data file from each mobile device, each data file including occupant information; and
updating at least one vehicle setting based on the occupant information;
updating the data file during operation of a vehicle;
transmitting the updated data file to the mobile device; and
deleting the updated data file from a local memory after the updated data file is transmitted to the mobile device and after an occupant associated with the mobile device has exited the vehicle.

11. The method of claim 10, further comprising presenting instructions to-the occupant, wherein the instructions are based at least in part on the occupant information.

12. The method of claim 10, further comprising presenting a plurality of virtual seats and a device identifier associated with the mobile device.

13. The method of claim 12, further comprising prompting the occupant to associate the device identifier with one of the virtual seats.

14. The method of claim 13, wherein updating the at least one vehicle setting is based at least in part on the virtual seat associated with the device identifier.

15. The method of claim 13, further comprising receiving a selection associating the device identifier with one of the virtual seats, wherein the at least one vehicle setting is updated based at least in part on the virtual seat associated with the device identifier.

16. The method of claim 10, wherein updating the data file includes updating the data file based at least in part on how the occupant associated with the at least one mobile device operates the vehicle.

17. The method of claim 10, further comprising requesting the data file from each paired mobile device.

18. A vehicle system comprising:
a communication interface programmed to pair with at least one mobile device in a vehicle;
a user interface device programmed to present a plurality of virtual seats and a device identifier associated with each paired mobile device and prompt at least one occupant to associate each device identifier with one of the virtual seats; and
a processing device programmed to receive a data file sent by each paired mobile device, the data file including occupant information, wherein the processing device is programmed to update at least one vehicle setting based on the occupant information associated with a vehicle occupant, update the data file during operation of the vehicle based at least in part on how an occupant associated with the at least one mobile device operates the vehicle, and command the communication interface to transmit the updated data file to the mobile device, and
wherein the user interface device is configured to present instructions based at least in part on the occupant information, and
wherein the processing device is programmed to delete the updated data file from a local memory device after the updated data file is transmitted to the at least one mobile device and after the occupant associated with the at least one mobile device has exited the vehicle.

* * * * *